United States Patent [19]

Kapiloff

[11] Patent Number: 5,102,338
[45] Date of Patent: Apr. 7, 1992

[54] METHOD FOR TRAINING CHILDREN IN THE ART OF DIALOGUE WRITING

[75] Inventor: Anita G. Kapiloff, Chevy Chase, Md.

[73] Assignee: Peaches Press Ltd., Gaithersburg, Md.

[21] Appl. No.: 560,563

[22] Filed: Jul. 31, 1990

[51] Int. Cl.$^5$ ............................................. G09B 19/00
[52] U.S. Cl. ................................... 434/162; 434/167; 434/433
[58] Field of Search ............... 434/162, 165, 167, 176, 434/177, 433, 363

[56] References Cited

U.S. PATENT DOCUMENTS

| 2,361,154 | 10/1944 | Schoolfield | 434/167 |
| 2,669,789 | 2/1954 | Buell | 434/167 |
| 2,728,997 | 1/1956 | Gross | 434/167 |
| 4,262,422 | 4/1981 | Pass | 434/162 X |

FOREIGN PATENT DOCUMENTS 843030  8/1960  United Kingdom ................ 434/167

OTHER PUBLICATIONS

*Developmental Learning Materials*, 1976; pp. 39, 86, 95.
*The Bug's Bunny Cartoon Workshop*, Novotrade International Inc.; copyright 1990; pp. 111–119.

Primary Examiner—Robert Bahr
Assistant Examiner—L. Thomas
Attorney, Agent, or Firm—Epstein, Edell & Retzer

[57] ABSTRACT

A method for training individuals in the art of writing dialogue utilizes a bound volume of pages depicting scenes arranged in a sequence pursuant to a pre-prepared story outline. Each scene includes one or more characters in the story and enclosed caption bubbles with underlined blank spaces in which a trainee is instructed to handwrite words corresponding to statements the trainee believes the characters might be saying. The page material permits pencil markings to be easily erased. Illustrations may be outline drawings suitable for coloring by the trainee. An instructor typically evaluates the handwritten dialogue and advises the trainee pursuant to the evaluation.

5 Claims, 1 Drawing Sheet

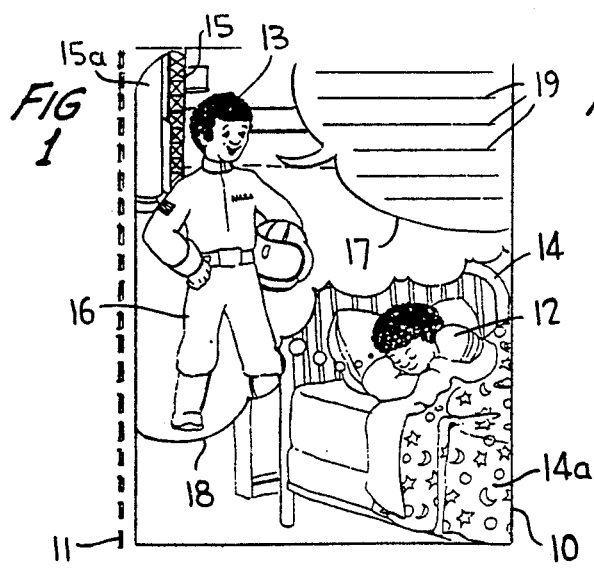
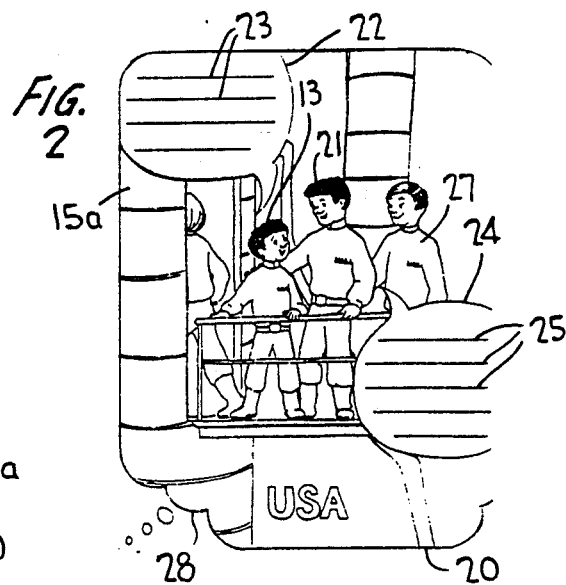
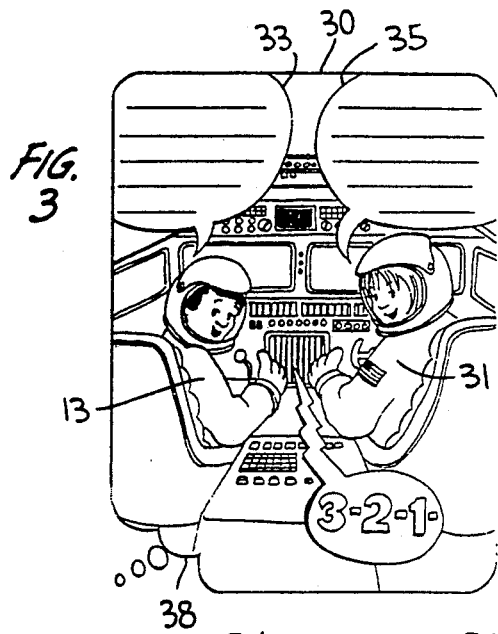
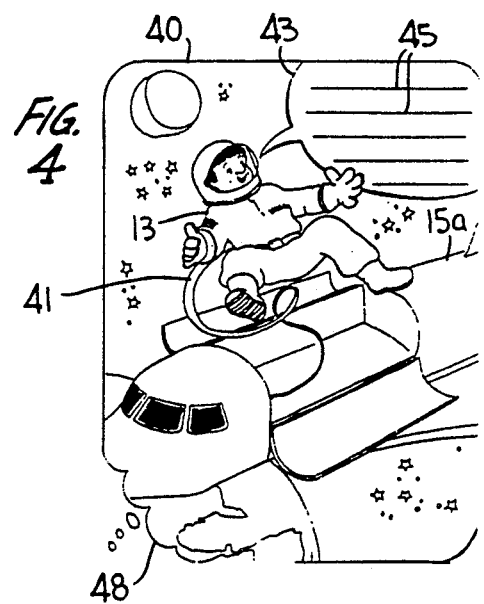
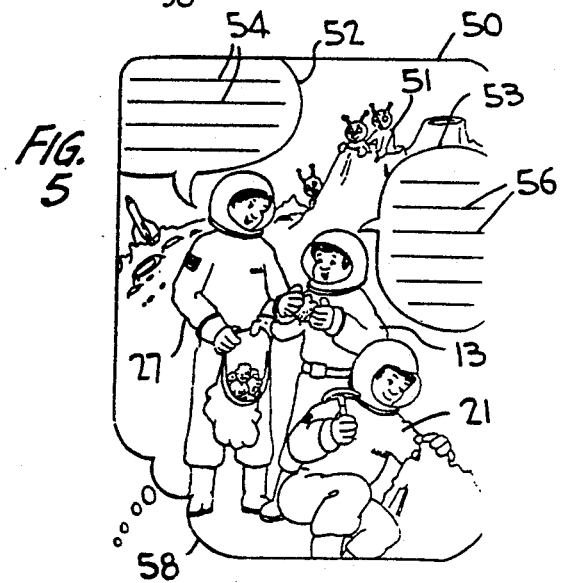
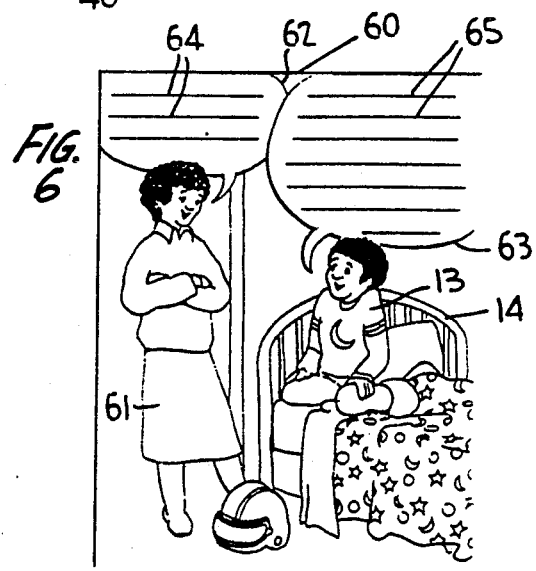

METHOD FOR TRAINING CHILDREN IN THE ART OF DIALOGUE WRITING

BACKGROUND OF THE INVENTION

1. Technical Field

The present invention relates to methods and apparatus for training young people in writing plays and dialogue. More particularly, the present invention utilizes a unique concept in workbooks to enable trainees to write dialogue pursuant to a suggested story line.

2. Discussion Of The Prior Art

Playwrighting instruction is largely ignored in elementary schools and most high schools. It is not until college that courses in playwrighting techniques are available for students. By then, many students, without any previous training or opportunity to write dialogue or plays, have channeled their creativity into other areas.

It is accepted among educators that arts and skills are more likely to be retained and enhanced if taught to children while they are young. Until the present invention, there have been no attempts to enable and encourage young children (i.e., ages five and up) to develop and enhance playwrighting and dialogue writing skills.

OBJECTS AND SUMMARY OF THE INVENTION

It is an object of the present invention to provide an apparatus and method for enabling young children to develop and enhance playwrighting and dialogue writing skills.

It is another object of the present invention to provide a technique whereby children can practice and develop skills in writing dialogue utilizing a novel workbook designed specifically for that purpose.

In accordance with the present invention, a method for developing dialogue writing skills includes creating a general story outline involving at least two characters and providing a series of illustrations depicting scenes from the story. Each illustration includes an enclosed caption space with underlines therein on which a trainee may write dialogue representing the trainee's concept of what the characters in the story are saying in the depicted scene. The illustrations are printed on pages that are bound together in a volume with the illustrations arranged according to the sequence of occurrence of their scenes in the story. The trainee is instructed to fill in the captions and thereby write dialogue for the suggested story line. This is an entirely different technique from training children to write stories; that is, the story line is already created for the trainee who can then channel his or her efforts toward the creation of dialogue within the confines of the suggested story line.

The pages containing the various illustrations are preferably made of material from which pencil markings are easily erased, thereby enabling trainees to make changes as deemed necessary, both as the trainee writes the original dialogue and also in response to critical evaluation by an educator or parent. The illustrations themselves are preferably outline drawings of characters and objects that the trainee can color in as desired. The dialogue entries may be evaluated by a teacher or parent who would typically then discuss the dialogue entries with the trainee and possibly make suggestions aimed at improving the trainee's techniques. In addition, the trainee's use of proper grammar and spelling can be monitored.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein FIGS. 1-6 are respective illustrations representing scenes in a story and containing caption spaces that are blank except for underlines on which a trainee can enter words representing dialogue.

DESCRIPTION OF THE PREFERRED EMBODIMENT

The present invention utilizes a workbook volume containing multiple pages, each consisting of at least one drawing illustration depicting a scene in a story line. In the preferred embodiment, each page contains a single illustration, although two or more scenes may be depicted on each page. Six typical scene illustrations, prepared in accordance with the present invention are illustrated in FIGS. 1-6, respectively. The illustrations are arranged in the accompanying figures pursuant to the sequence of occurrence of their depicted scenes in the pre-prepared story line. Although only six scene illustrations are thusly shown herein, it is to be understood that a workbook prepared pursuant to the present invention typically includes at least fifteen, and often more, such scenes sequentially arranged. The pages are bound together in any conventional manner, such as with ring binders, permanent binding, stapling, or the like, with the scenes in appropriate sequence pursuant to the story line. In FIG. 1, for example, a portion of a ring binder 11 is shown along the lefthand side of the illustration page 10.

Referring specifically to the drawings, in the scene depicted in FIG. 1, a young boy 12 is shown in a bed 14 dreaming of being an astronaut 13 standing before a launch site gantry 15 wearing a spacesuit. In the dream 18 he is depicted as saying something, as represented by the underlines 19 disposed in an otherwise empty enclosed caption space 17. The underlines 19 are adapted to receive handwritten words representative of what the trainee believes is being said by the young astronaut 13 in the dream 18. The young boy, as depicted in the dream at 13 and asleep in bed at 12, is drawn in outline form so that he and his apparel may be colored in by the trainee. Likewise, the objects in the scene, such as the bed 12, blanket 14a, gantry 15, and missile 15a are suitable for coloring.

The paper on which the drawn illustrations appear is preferably of the type on which pencil markings may be made to facilitate entry of words in the caption spaces 17. In addition, the paper should be of the type from which the pencil markings are easily erased. The page material should also be suitable for receiving markings from a crayon, colored pencil, coloring paints, or the like.

Referring now to FIG. 2 of the accompanying drawings, a second page 20 depicts a subsequent scene in the story comprising a later part of the young boy's dream 28 wherein he is boarding missile 15a along with other astronauts. The young boy 13 is saying something to one of the astronauts 21 as indicated by the enclosed caption space 22 pointed to the young boy and containing underlines 23 on which words can be written by a trainee. One of the astronauts 21 is also saying something to the young boy 16 as indicated by the second enclosed caption space 24 with underlines 25.

FIG. 3 is a page 30 a later part of the young boy's dream 38 is depicted with the young boy 13 sitting at the controls of the missile along with a copilot 31, both characters having enclosed caption spaces 33, 35, respectively, with underlines on which a trainee according to the invention can enter words representing the trainee's thoughts of what is being said by the characters in the story.

The page 40 in FIG. 4 shows another part of the young boy's dream 48 is shows him floating in space, with a tether 41 connected between the boy 13 and the spaceship 15a and saying something as indicated by the enclosed caption space 43 having underlines 45 therein. The scene on page 50 in FIG. 5 is a subsequent part 58 of the young boy's dream and show the young boy 13 on the surface of a planet, moon, or other celestial body. The young boy 13 and two other astronauts 21, 27 are collecting mineral samples while being watched by resident life forms 51. One of the astronauts 27 and the young boy 13 are having a conversation as indicated by the two enclosed caption spaces 52, 53 pointing at that astronaut and the young boy. Again, each of the caption spaces contains underlines 54, 56 on which a trainee, pursuant to the present invention, can enter words representing the dialogue being carried on between the young boy and the astronaut.

FIG. 6 is a page 60 wherein the young boy 13 is shown in bed 14 having awakened from his dream and holding a conversation with his mother 61. The existence of a conversation is represented by the enclosed caption spaces 62,63 having underlines 64,65 on which a trainee, pursuant to the present invention, can enter words representing the trainee's thoughts as to what is being said between the characters.

A trainee is typically instructed to study all of the depicted scenes and then fill in all of the enclosed caption spaces by writing on the underlined portions. The trainee is instructed to enter words that the trainee believes to be representative of what is being said by the characters in each scene. All of the scenes are to be thusly filled in with words spoken by the characters. After the trainee has completed the task, an educator or parent evaluates the entire volume for content as well as for grammar and spelling. The result of the evaluation is then discussed with the trainee who is urged to make whatever corrections are necessary by erasing portions of the handwritten statements and replacing the erased portions with handwritten words as necessary. By this technique the educator or parent is able to monitor the child-trainee's grammar and spelling while gaining insight what the child is thinking about and feeling. Most importantly, the child is being trained in the art of writing dialogue at a very early age, typically five years old and up. The child will thereby obtain insight into dialogue writing at a very early age.

The child is required to look through the entire bound volume before he or she begins to write the dialogue so that the continuity of the story will be appreciated prior to entry of dialogue in any one or more the scenes. The various pictures, as indicated above, can also be colored in to add to the fun of the training exercise.

From the foregoing description it will be appreciated that the invention makes available a novel method and apparatus whereby a pre-prepared story line is illustrated in a series of scenes containing captions with underlines on which a trainee can enter his or her thoughts of what is being said by the characters in the scenes, thereby providing a training exercise in the art of dialogue writing.

Having described the preferred embodiment of a new and improved method and apparatus for training children in the art of dialogue writing, it is believed that other modifications, variations and changes will be suggested to those skilled in the art in view of the teachings set forth herein. It is therefore to be understood that all such variations, modifications and changes are considered to fall within the scope of the present invention as defined by the appended claims.

What is claimed is:

1. A method of teaching a trainee to create and write dialogue comprising the steps of:
   (a) creating a story outline involving at least two interacting characters;
   (b) providing multiple illustrations depicting said characters in multiple respective scenes in said story outline;
   (c) providing enclosed caption spaces in each illustration for receiving handwritten letters representing plural words spoken by said characters, said enclosed caption spaces being empty except for plural parallel lines representing underlines on which said plural words can be handwritten by said trainee;
   (d) arranging said illustrations on a plurality of pages and in a sequence according to the order of occurrence of their depicted scenes in said story outline;
   (e) binding said pages together in a volume with said illustrations arranged in said sequence; and
   (f) instructing the trainee to write words in said caption spaces to represent the trainee's thoughts of what said characters are saying in each of said scenes depicted in said illustrations.

2. The method according to claim 1 wherein step (f) further includes instructing the trainee to look through said volume in its entirety before writing words in said caption spaces.

3. The method according claim 2 wherein step (b) includes providing said illustrations as drawings with the figures therein suitable for coloring by the trainee, said method further comprising the step of instructing the trainee to color in the figures in said drawings.

4. The method according to claim 2 wherein step (b) includes providing said illustrations on paper of the type from which pencil markings are readily erased, and wherein in step (f) includes instructing the trainee to write said words with a pencil.

5. The method according to claim 4 further comprising the steps of:
   (g) evaluating the dialogue written by said trainee;
   (h) advising the trainee of the results of the evaluation of step (g); and
   (i) instructing the trainee to erase some of the words written in said captions pursuant to said evaluation.

* * * * *